(12) United States Patent
Wang

(10) Patent No.: US 8,396,746 B1
(45) Date of Patent: Mar. 12, 2013

(54) PRIVACY PRESERVING PERSONALIZED ADVERTISEMENT DELIVERY SYSTEM AND METHOD

(75) Inventor: Xuefu Wang, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1843 days.

(21) Appl. No.: 11/084,384

(22) Filed: Mar. 18, 2005

(51) Int. Cl.
*G06Q 30/00* (2012.01)
*G06F 3/00* (2006.01)

(52) U.S. Cl. ............... 705/14.69; 705/14.41; 705/14.45; 725/46

(58) Field of Classification Search ............... 705/1–30; 707/1–10; 345/745; 235/10–14; 725/46
See application file for complete search history.

(56) References Cited

U.S. PATENT DOCUMENTS

| | | | | |
|---|---|---|---|---|
| 5,794,210 | A * | 8/1998 | Goldhaber et al. | 705/14 |
| 6,182,050 | B1 * | 1/2001 | Ballard | 705/14 |
| 6,334,109 | B1 * | 12/2001 | Kanevsky et al. | 705/14 |
| 7,065,537 | B2 * | 6/2006 | Cha et al. | 707/202 |
| 7,158,943 | B2 * | 1/2007 | van der Riet | 705/14 |
| 2002/0003162 | A1 * | 1/2002 | Ferber et al. | 235/14 |
| 2002/0055909 | A1 * | 5/2002 | Fung et al. | 705/42 |
| 2002/0152463 | A1 * | 10/2002 | Dudkiewicz | 725/46 |
| 2004/0001087 | A1 * | 1/2004 | Warmus et al. | 345/745 |

OTHER PUBLICATIONS

Asonov, Dmitri, "Private Information Retrieval—An Overview and Current Trends, Proc. of ECDPvA Workshop," Informatik 2001, Vienna, Austria, Sep. 2001.

Bozios, T. G. Lekakos, V. Skoularidou, and K. Chorianopoulos. 2001. "Advanced techniques for personalized advertising in a digital TV environment: The imedia system." In *Proceedings of the eBusiness and eWork Conference.*

MacDonald, R. and Silver, D., 2002, "Web-based User Profiling Using a Recurrent Neural Network," *Proceedings of the IASTED International Conference on Artificial Intelligence and Soft Computing (ASC2002),* Banff, Alberta, Jul. 2002, H. Leung (Ed.), ACTA Press, p. 472-477.

Pramataris, K., Papakyriakopoulos, D., Lekalos, G., Mylonopolous, N., "Personalized Interactive TV Advertising: The IMEDIA Business Model," Journal of Electronic Markets, vol. 11 (1): 1-9 (2001).

Schiaffino, S., Amandi, A., "User Profiling with Case-Based Reasoning and Bayesian Networks," Open Discussion Proceedings, IBERAMIA-SBIA 2000, Atibaia, Brazil, Nov. 2000, pp. 12-21.

\* cited by examiner

*Primary Examiner* — Sun Li
(74) *Attorney, Agent, or Firm* — Morgan, Lewis & Bockius LLP

(57) ABSTRACT

A user is associated with profile information indicating a level of interest in a plurality of topic categories. To obtain an advertisement for a preferred category, the client requests advertisements data from two servers. A request to one of the ad servers includes a user preferred category and a number of other categories. A request to the other ad server includes only the other categories. After the servers send advertisements corresponding to the categories in the requests, a difference is determined between the received advertisements, which produces the advertisement for the preferred category. In some embodiments, a single request is made to a server for a number of advertisements, those advertisements corresponding to the user's profile information are provided a higher likelihood of display in accordance with the advertisement's similarity to the user's profile.

24 Claims, 6 Drawing Sheets

PRIVACY PRESERVING PERSONALIZED ADVERTISEMENT DELIVERY SYSTEM AND METHOD

TECHNICAL FIELD

The embodiments of this invention relates generally to computer-implemented advertising, and more particularly, to personalization of advertisements in a way that preserves user privacy.

BACKGROUND

Online advertisers have often struggled with the problem of their advertisements (also written as "ads") being ignored by their perceived target audiences. The target audiences often ignore the advertisements because they do not match their preferences. As a result, content providers and advertisers strive to make advertisements more relevant to individual users, i.e., to personalize advertisements.

One attempt to make advertisements more relevant involves serving advertisements based on the content of the web page a user is viewing, based on the premise that the user viewing the web page is interested in ads related to the subject matter of the web page. However, this solution tailors advertisements to the content of the web page, which does not necessarily reflect the individual actual user's preferences. Furthermore, there are content providers and advertisers who do not participate in services that serve advertisements based on page content, yet still have the problem of users ignoring their advertisements because of their perceived irrelevance.

The problems associated with tailoring advertisements to individual users are further heightened by concerns regarding privacy. Advertisement personalization often involves collection, retention, and sharing of personal information. Many users are wary of the privacy implications of these practices, and thus have objected to advertisement personalization.

SUMMARY

According to an aspect of the invention, a method of selecting advertisements includes identifying first and second category information, retrieving a first set of advertisements based on the first category information and the second category information, retrieving a second set of advertisements based on the second category information, and identifying one or more advertisements associated with the first category information based on the retrieved first set and second set.

According to another aspect, a method of serving advertisements includes receiving a request for advertisements from a requestor, the request including a plurality of categories, identifying advertisements corresponding to the plurality of categories in the request, mathematically combining the identified advertisements, and sending the combined advertisements to the requestor.

According to another aspect, a method of selecting advertisements includes requesting a set of advertisements using a request including category information, the category information including a plurality of categories, wherein one of the plurality of categories is a preferred category from a user profile. The set of advertisements is received. An advertisement corresponding to the preferred category from the user profile is identified from the set of advertisements. A display rank value of the identified advertisement is modified.

BRIEF DESCRIPTION OF THE DRAWINGS

For a better understanding of the aforementioned aspects of the invention as well as additional aspects and embodiments thereof, reference should be made to the detailed description of the embodiments below, in conjunction with the following drawings in which like reference numerals refer to corresponding parts throughout the figures.

DETAILED DESCRIPTION OF THE EMBODIMENTS

Figures 1, 2:
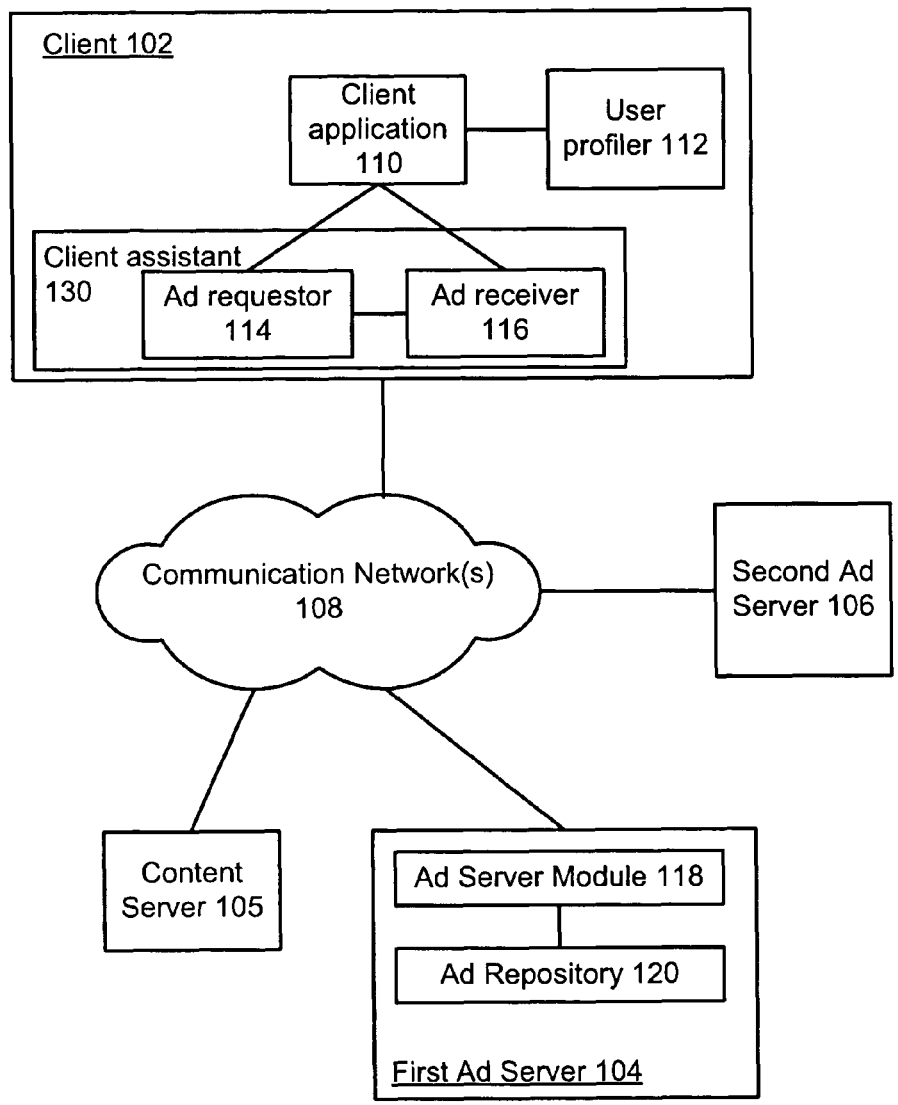
FIG. 1 is a block diagram of an exemplary network environment, according to some embodiments of the invention.
FIG. 2 is a diagram of an exemplary user profile, according to some embodiments of the invention.

FIG. 1 illustrates an exemplary network environment 100, according to some embodiments of the invention. The network environment 100 includes at least one client 102, first ad server 104, and content server 105. In some embodiments, both first ad server 104 and content server 105 may be associated with a content provider. In some embodiments, the network environment 100 also includes a second ad server 106. Client 102 includes client application 110, user profiler 112, and a client assistant 130 which may include user profiler 112, ad requestor 114, and ad receiver 116. However, in some embodiments user profiler 112 is separate from the client assistant 130. Ad server 104/106 includes ad server module 118 and ad repository 120. In some embodiments, the ad repositories 120 of the first and second ad servers 104 are identical. The network environment 100 also includes one or more communication network(s) 108 that interconnect these components.

Client application 110 may be any application that can render content for display to a user. Exemplary client applications 110 may include, without limitation, web browsers, electronic messaging programs, and instant messaging (IM) programs. Content may include any combination of text, graphics, video, audio, etc. In embodiments where client application 110 is a web browser, content may be a page written in Hypertext Markup Language (HTML), or any other suitable language for processing by a web browser (e.g., XML), that includes any combination of text, graphics, video, audio, etc. and possibly one or more hyperlinks to other content (e.g., a web page).

Ad requestor 114 requests advertisement data from one or more ad servers. Ad receiver 116 receives the advertisement data and determines the advertisement(s) to be presented to the user based on the received advertisement data. In some embodiments, client assistant 130 may be implemented as a series of executable commands, such as a script, embedded in a web page served by content server 105. When the web page is loaded by client application 110, client 102 executes the ad commands and loads the client assistant 130 into memory. In embodiments where the client assistant 130 ad commands are in the form of a script, the script may be written in any suitable scripting language, such as JavaScript or Perl. Further details about the client assistant 130 are described in relation to FIG. 3.

Ad repository 120 is the repository of the advertisements served by ad server 104/106. An advertisement (or "ad") is a public notice, such as one for purposes of attracting patronage for a product or a service. One or more advertisements may be displayed in conjunction with or at the same time as other content, such as web pages, email messages, search results, etc. Some of the advertisements may be associated with categories that are also associated with the other content. Advertisements may be any combination of text, graphics, video, audio, etc. For example, an advertisement may include only text (text-based advertisement), only a graphic image (image-based advertisement), or a combination of both. Each advertisement in ad repository 120 may be represented by a sequence of bits.

The advertisements in ad repository 120 are categorized. For example, an advertisement for pet food may be categorized under a "pets" category and/or a sub-category thereof (e.g., "pet supplies"). In some embodiments, the advertisements may be categorized using the categories defined by the Open Directory Project (ODP, http://dmoz.org), or a subset of those categories. Each advertisement in ad repository 120 may be categorized by associating the advertisement with one or more identifiers of the category or categories with which the advertisement is associated.

FIG. 2 illustrates an exemplary user profile 200 for a user, according to some embodiments of the invention. The user profile includes a listing of identifiers for a plurality of categories 202 and their corresponding preference scores 204. Each category identifier corresponds to a category. In some embodiments, the set of categories used for the user profile may be the categories defined by the Open Directory Project (ODP), or subset of the ODP categories. In some embodiments, the set of categories used to categorize advertisements in ad repository 120 and the associated identifiers are the same as the categories and associated identifiers used in user profile 200. In other words, the category identifiers in the user profile 200 are selected from the same set of category identifiers as those used to categorize advertisements. As a result, one or more of the categories in the user profile 200 will typically correspond to one or more advertisements in ad repository 120 that are associated with the same categories.

For each category 202 in user profile 200, there is a corresponding preference score 204. As discussed below, the preference scores 204 may be determined by user profiler 112. In some embodiments, the preference scores are normalized such that all of the preference scores in a user profile add up to a predefined number, such as 1, 100, or $2^{16}$. In embodiments in which the preference scores in a profile sum to a value such as 1 or 100, the preference scores comprise raw probabilities of the user preferring a respective category. A higher score may be associated with a higher preference by the user. For example, in FIG. 2, category "Cat1" has a preference score of 0.07. Thus, "Cat1" may be a category less preferred by the user than "Cat3", which has a preference score of 0.41, or "Cat4" with a preference score of 0.20. In alternative embodiments, the preference scores may be based on an alternative scale, e.g., 0 to 100. In some embodiments, the preference scores are not normalized and therefore do not sum to a predefined, unchanging number.

A user profile 200 for a user is created at client 102 by user profiler 112. User profiler 112 may work separately from or in conjunction with client application 110. For example, user profiler 112 can analyze a web page being displayed in client application 110 and use the results of the analysis as a basis for calculating preference scores. User profiler 112 may be distributed to client 102 as part of client application 110 or separately. The user profiler 112 may be distributed to client 102 as part of other modules, such as part of the client assistant 130.

User profiler 112 creates and updates the user profile 200 based on content accessed by the user. In some embodiments, the content used as bases for creating or updating the user profile may include web pages, emails, and instant messaging (IM) messages. User profiler 112 may detect the access of content by a user and analyze the content in response. For example, user profiler 112 may detect that the user is accessing a web page through client application 110, and analyze the web page being accessed. User profiler 112 identifies one or more topics for the accessed content by analyzing the content. In some embodiments, the universe of possible topics that can be identified for particular content is the set of ODP categories, or a subset or superset thereof, although other categorizations are equally applicable. In the example of the user accessing a web page, user profiler 112 may analyze the web page and identify one or more topics for the web page. The identified topic(s) represent a categorization of the content. Different parts of the content may be accorded different weights in the analysis. For example, the title of the content may be accorded more weight because the title may be more indicative of the topics that may be identified for the content. Furthermore, the weight accorded to the topics identified from a web page may be a function of the user's activity with respect to the web page. For example, user activity indicating strong user interest, such as cursor movement over the page, scrolling of the page, or clicking a link within the page, may be used when determining the topic scores for the page; and user activity indicating a lock of user interest, such as a display time that is less than a threshold value (e.g., 5 seconds), may also be used when determining the topic scores for the page.

User preferences can change over time. Thus, the user profile may be updated. In some embodiments, the user profile 200 is updated by the user profiler 112 periodically. User profiler 112 may accumulate content analyses results, i.e., the topics identified for content accessed by the user, between scheduled updates. At a scheduled update, the results are used to update user profile 200, by calculating new preference scores for the categories in user profile 200. In alternative embodiments, the user profile 200 may be updated after the analysis of particular content, in addition to or in lieu of updating the user profile periodically.

Various well-known techniques may be used to analyze content and calculate preference scores based on one or more content analyses. Such techniques may include keyword extraction and frequency analysis, Bayesian networks, and neural networks.

It should be noted that while the user profiler 112 is located in the client 102 in the embodiments described above, in other embodiments the user profiler 112 may reside in one or more servers, or the functionality of the user profiler may be distributed to operate in part on the client 102 and in part on one or more servers. While having the user profiler 112 operate solely on the client 102 may have advantages for protecting user privacy, server and distributed implementations of the user profiler may be desirable when the client is a "thin client" with little computational resources, or when a user uses two or more clients and prefers to have a single, consistent user profile 200 across two or more of those clients.

Figure 3:
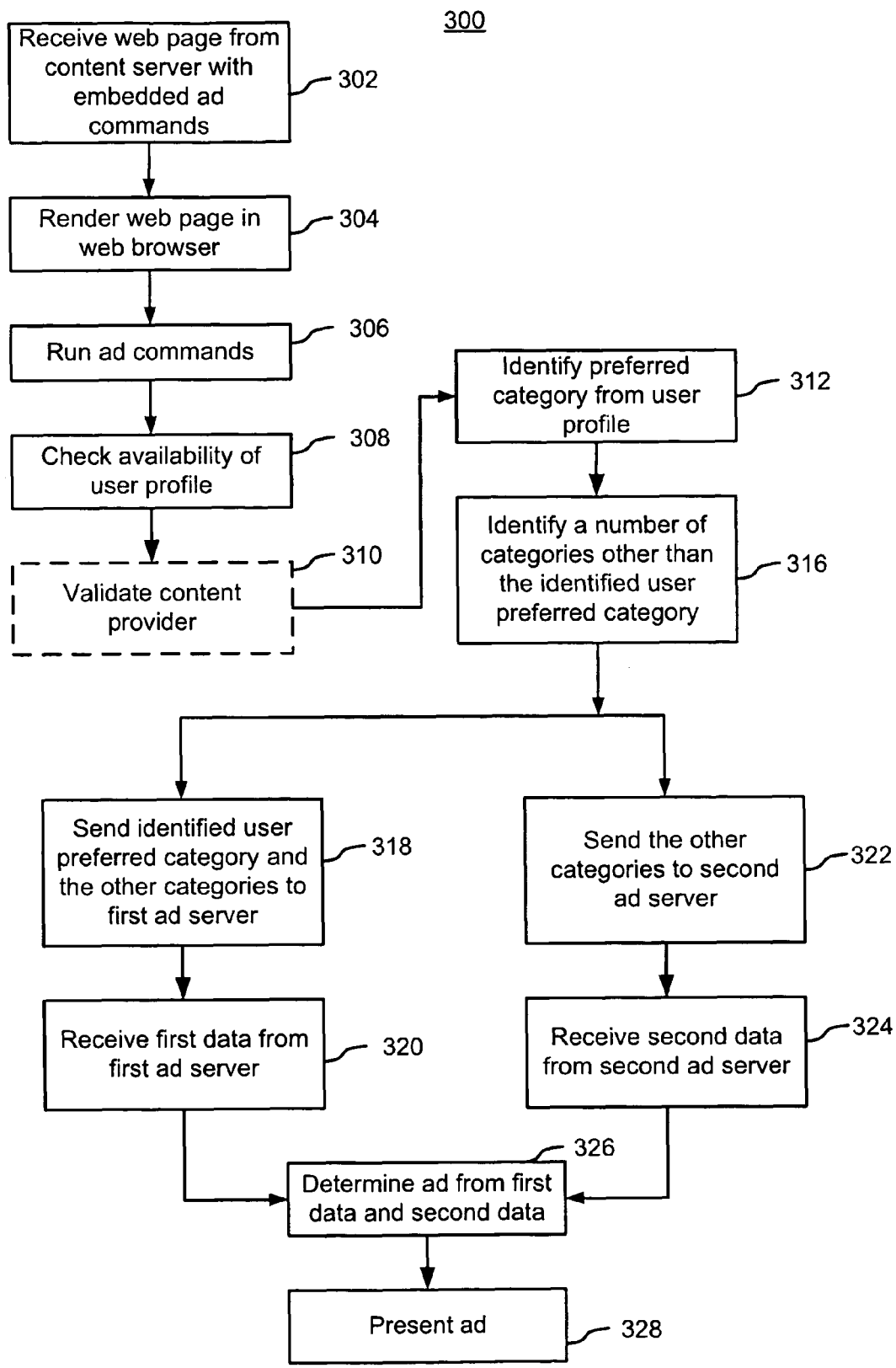
FIG. 3 is a flowchart illustrating an exemplary process for personalizing advertisements, according to some embodiments of the invention.

FIG. 3 illustrates an exemplary process 300 for personalizing advertisements, according to some embodiments of the invention. A user on client 102 requests a web page from content server 105 (e.g., www.cnn.com). Client 102 receives the web page, which, according to some embodiments, includes embedded ad commands (302). For example the client assistant 130 may received the web page from content server 105. Client 102 renders the web page in client application 110, e.g., a web browser (304). The embedded ad commands are executed (306). In some embodiments, executing the ad commands loads the ad requestor and receiver into memory 610 (FIG. 6) of client 102.

Ad requestor 114 checks an availability of the user profile 200 for the user on client 102 (308). Ad requestor 114 checks for the availability of the user profile 200 before proceeding further because advertisements cannot be personalized without the user profile. The user profile may not be accessible because there is no user profile on client 102 or, in some embodiments, the user may have enabled an option to block access to the user profile and thus disallow advertisement personalization. If the user profile is not available, the ad requestor 114 stops the personalization process and requests an advertisement that is not personalized, such as a default advertisement, for display to the user.

If ad requestor 114 finds that the user profile 200 is accessible, it may, in some embodiments, optionally validate the content provider who served the content as an authorized distributor of the ad requestor 114 or as an authorized user of the personalized ad distribution system (310). Authorized content providers may be paid compensation or charged fees for impressions (displays) and/or click-throughs of personalized advertisements provided by the embodiments of the invention. The content provider may be authenticated by querying a database of authorized content providers. If the content provider cannot be authenticated, then ad requestor 114 may stop the personalization process and request an advertisement that is not personalized, such as a default advertisement, for display. If the content provider is validated, the process continues.

Ad requestor 114 identifies a user preferred category from user profile 200 (312). In some embodiments, the identified user preferred category is the category in user profile 200 with the highest preference score. In alternative embodiments, more than one user preferred category may be identified. For example, the identified user preferred categories may be the five categories in user profile 200 with highest preference scores. A number of other categories are selected (316). The other categories may be selected from the entire set of categories listed in user profile 200, not including the identified user preferred category or categories. In other words, the identified user preferred category or categories and the other categories are mutually exclusive. The number of other categories selected is 1 or greater (e.g., 9), with the maximum being the total number of categories in user profile 200 minus the number of identified user preferred categories. In some embodiments, the other categories are selected randomly. Ad requestor 114 sends the identifiers of the identified user preferred category/categories and the other categories in a first request to first ad server 104 (318). Ad receiver 116 receives a first data in response from first ad server 104 (320). Ad requestor 114 also sends the identifiers of the other categories in a second request to second ad server 106 (322). Ad receiver 116 receives a second data in response from second ad server 106 (324). It should be appreciated that the sending of the first and second requests and receiving of the first and second data may be performed in parallel (as shown in FIG. 3) or serially. It should be noted that since the first ad server and the second ad server contain identical sets of ads, a request for an ad corresponding to a particular category that is sent to both the first and second ad servers will result in the same ad being returned by both ad servers.

After receiving both the first and second data, ad receiver 116 determines the advertisement(s) to be presented to the user, based on the first and second data (326). The advertisement(s) to be presented may be determined by determining the difference between the first data and the second data. The difference between the results returned from the first ad server (i.e., those ads associated with the chosen category and those ad associated the "other" categories) and the results returned from the second ad server (i.e., those ad associated with the "other" categories) are the ad or ads corresponding to the chosen categories.

In some embodiments, the ads are returned individually from each of the first and second ad servers. Determining the difference in this instance requires removing ads which are present in both sets of results. What is left after duplicate removal is the difference, i.e., the ads corresponding to the one or more identified user preferred categories. In some embodiments each of the first and second data is a mathematical combination or compression of the set of ads which correspond to the categories in the corresponding request. Sending a compressed set requires less bandwidth than sending the ads individually. In one embodiment, the number of preferred ads to be determined is one (e.g., when the number of identified user preferred categories is one). When the first and second data are each the result of a mathematical combination (e.g., by a bit-wise exclusive-or), of a plurality of sequences of bits associated with advertisements (further details of which are described below in relation to FIG. 4), that difference (i.e., the ad corresponding to the chosen category) may be determined by a bit-wise exclusive-or operation between the first data and the second data. The sequence of bits resulting from the exclusive-or operation is the advertisement to be presented to the user. In the embodiments where each of the first and second data is a plurality of advertisements, or a data compression thereof, the difference may be determined by determining which advertisement(s) are in one data but not the other. If the first and second data are data compressions of the plurality of advertisements, the first and second data may be decompressed before the determination is performed. The resulting advertisement(s) are displayed to the user through client application 110 (328), in conjunction with or at the same time as other content.

In the process depicted in FIG. 3, the client 102 communicates with two ad servers 104 and 106. In alternative embodiments, client 102 may communicate with a single ad server, such as ad server 104, to obtain a set of advertisements. A request sent by the client 102 to the ad server includes one or more identified user preferred categories and a number of other categories. As discussed below with reference to FIG. 5, the client 102 receives a plurality of advertisements from the ad server, and then modifies rankings of the received advertisements so as to boost the rankings of received advertisements that are associated with the identified user preferred categories.

By sending requests that include multiple categories, the user's chosen category(s) are obscured, and thus the privacy of the user is protected. In the two ad-server embodiments, privacy is further protected by the fact that the two ad server both receive requests with multiple categories and they do not communicate with each other as to what the difference between the first request and the second request is (as described below). It should be appreciated that while increasing the number of other (i.e., not chosen) categories included in a request may increase privacy protection, there may be a tradeoff between increased privacy protection on the one hand and usage of server resources and bandwidth resources on the other hand.

Figure 4:
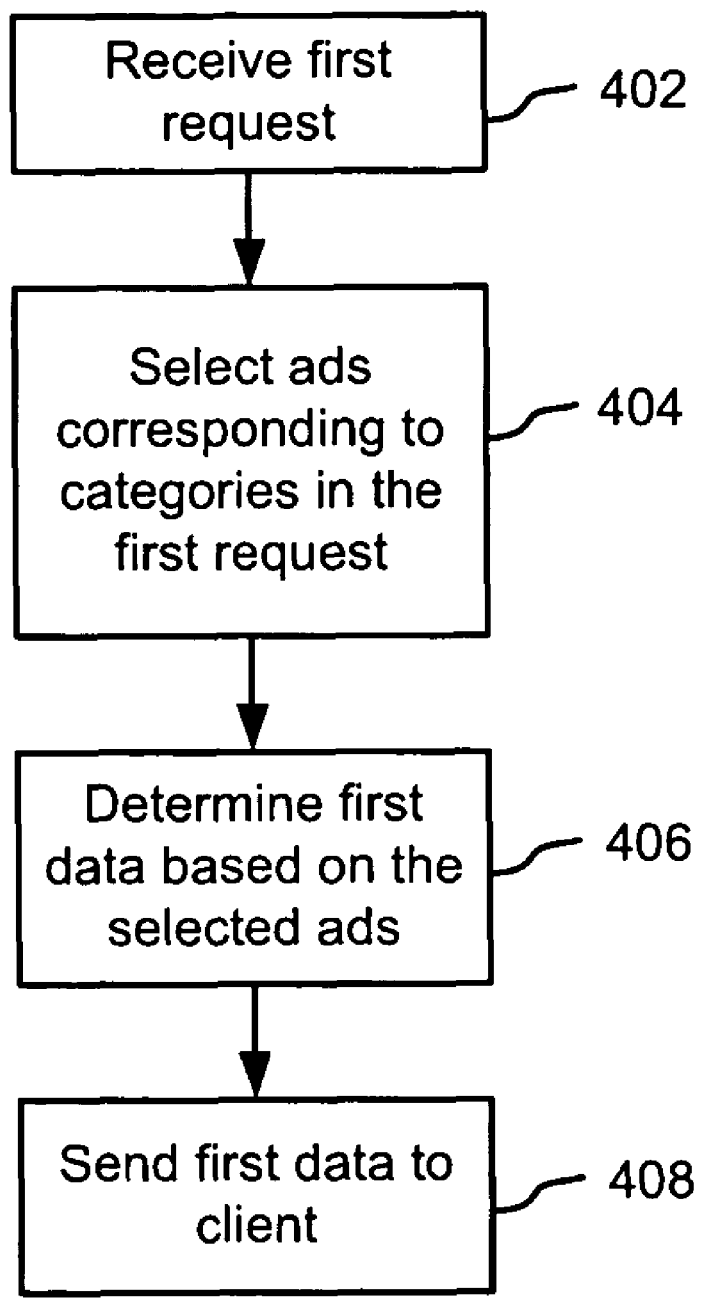
FIG. 4 is a flowchart illustrating an exemplary process for serving advertisements that may be personalized, according to some embodiments of the invention.

FIG. 4 illustrates an exemplary process for serving advertisements, according to some embodiments of the invention. As described above, in some embodiments, there may be a first ad server 104 and second ad server 106 in the network environment of FIG. 1. In these embodiments, second ad server 106 mirrors the set of advertisements in first ad server 104, i.e., second ad server 106 stores the same advertisements that are stored in first ad server 104. Additionally, the first ad server 104 and second ad server 106 may be in separate locations and do not send data to each other, except possibly to mirror advertisements and to send aggregated counts of advertisement retrievals, further details of which are described below. In alternative embodiments, there may be one ad server serving advertisements independently. For simplicity of explanation, first ad server 104 is assumed to be the single ad server of these alternative embodiments.

First ad server 104 receives a first request from client 102 (402). The first request includes a plurality of categories. First ad server 104 identifies and selects advertisements corresponding to the categories in the request (404). For instance, the ad server may identify and select one advertisement corresponding to each category in the first request. Alternately, it may identify and select one or more advertisements for each category in the first request. The advertisements are selected from the ad repository of first ad server 104. A first data is determined based on the selected advertisements (406). In some embodiments, the first data may be determined by mathematically combining a plurality of sequences of bits associated with the selected advertisements, e.g., by using a bit-wise exclusive-or operation. In alternative embodiments, the first data may be the selected advertisements, or a data compression thereof. First ad server 104 sends the first data to client 102 (408).

The operation of second ad server 106 is similar to that of first ad server 104, as described above. Second ad server 106 receives a second request that includes a plurality of categories. Second ad server 106 identifies and selects, from its ad repository, one or more advertisements corresponding to each category in the request. A second data is determined from the selected advertisements and sent to client 102. The second data, like the first data, may be a mathematical combination (e.g., by bit-wise exclusive-or) of the plurality of sequences of bits associated with the selected advertisements, or the second data may be the selected advertisements or a data compression thereof.

As described above in relation to FIG. 3, the first request includes one or more identified user preferred categories and a number of other categories, and the second request includes just the other categories. That is, the first request and the second request include the same categories, other than the identified user preferred category/categories in the first request. Thus, the plurality of advertisements selected based on the first request and the plurality of advertisements selected based on the second request should be exactly the same, other than the advertisement(s) corresponding to the one or more identified user preferred categories.

In the ad repository of ad server 104/106, there may be more than one advertisement associated with a particular category. In some embodiments, one or more advertisements may be selected amongst the advertisements that are associated with the category for inclusion in data to be sent to client 102. The one or more advertisements may be chosen based on predefined criteria. One criterion may be the cost-per-click of the advertisements. Other criteria may include the advertisements' past performance in terms of total revenue generated by the advertisements, the click-through rate of the advertisements, or any combination of the criteria described above. Alternately, a random or pseudo-random selection process or selection factor may be used to ensure that a user sees a variety of advertisements associated with the highest ranked categories in the user's profile.

In some embodiments, features that facilitate billing of advertisers may be included. For example, in some embodiments that utilize both the first ad server 104 and the second ad server 106, counts of requests for each advertisement may be tracked so that the number of impressions for each advertisement may be calculated. The number of advertisement impressions may be a basis on which an advertiser may be billed. As described above, the first ad server 104 receives a request that includes the chosen category and a number of other categories, and the second ad server receives a request that includes only the other categories. The advertisement to be displayed is the advertisement associated with difference between the two requests. The difference between the number of retrievals of each advertisement, for inclusion into advertisement data sent to a client 102, at first ad server 104 and second ad server 106, is the number of impressions for each advertisement. At both ad servers, whenever an advertisement is retrieved from the ad repository for inclusion in advertisement data to be sent to a client 102, in response to a request from the client 102, a count is incremented. For each advertisement, the count at the second ad server 106 may be sent to the first ad server 104. At the first ad server 104, the difference between the count at the first ad server 104 and at the second ad server 106 is determined, yielding the number of impressions for the advertisement.

It should be appreciated that this process of determining advertisement impressions works so long as the advertisements sent to the client that are associated with the chosen category (or categories) are all displayed. In other words, for the chosen category (or categories), the first ad server 104 retrieves from the ad repository, for inclusion into the advertisement data in response to a request from a client 102, only as many advertisements associated with the chosen category (or categories) as will actually be displayed responsive to the request and nothing more. This prevents inflation of advertisement impression counts.

Figure 5:
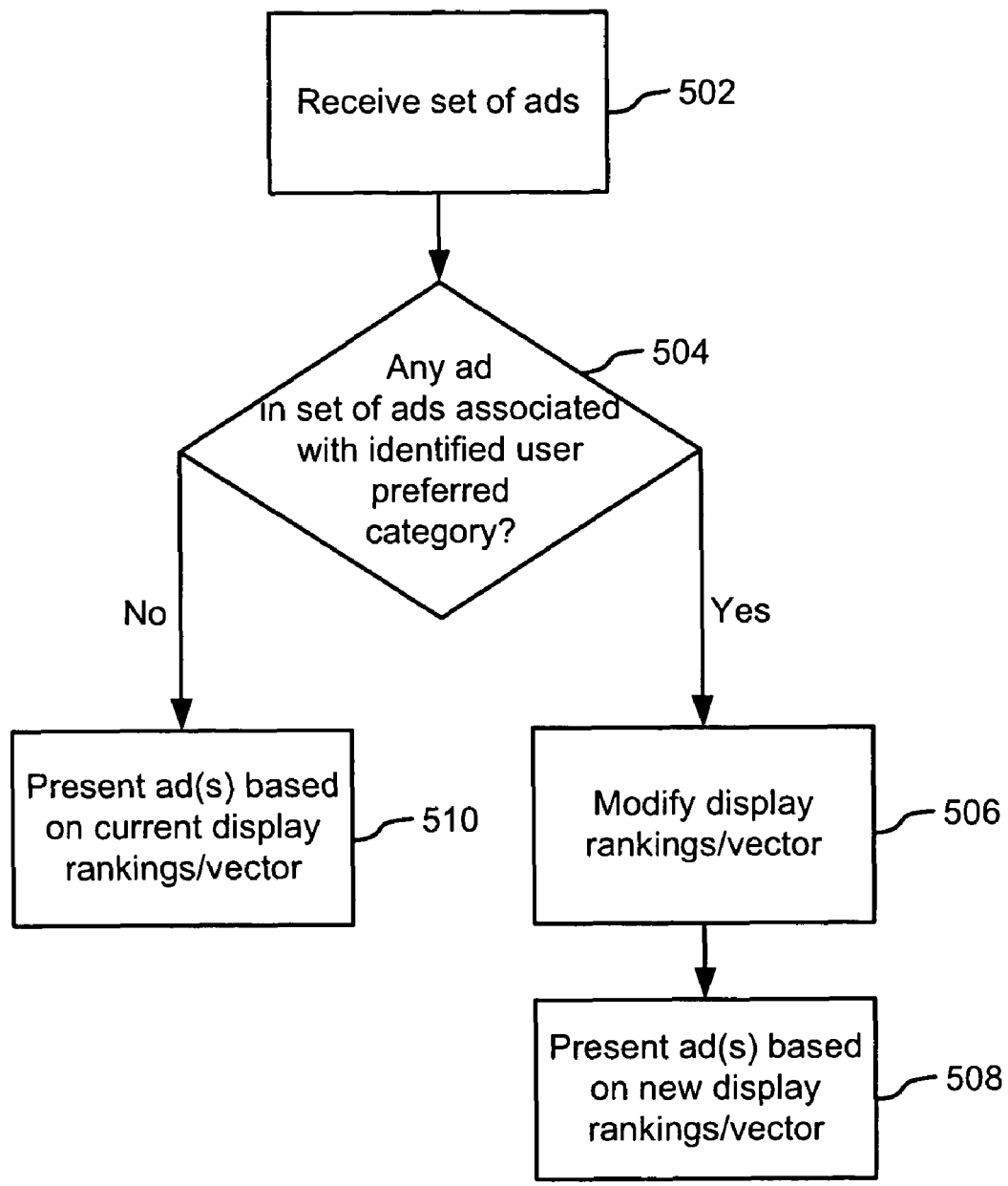
FIG. 5 is a flowchart illustrating an exemplary process for personalizing advertisements that are served based on the content of a web page, according to some embodiments of the invention.

FIG. 5 illustrates an exemplary process for choosing advertisements corresponding to particular categories for display, from amongst a plurality of advertisements, according to some embodiments of the invention. In some embodiments, client 102 may receive a plurality of advertisements or a data compression thereof. At least a subset of the plurality may be chosen for display to the exclusion of the other advertisements in the plurality. Alternatively, if each advertisement is associated with a display ranking, the display ranking(s) of the advertisement(s) corresponding to particular categories may be increased, so that these advertisements are more likely to be displayed, and if displayed, displayed more prominently.

Client 102 receives, from an ad server, a set of one or more advertisements (502). The advertisements may be served by the ad server based on their relevancy to particular content that the user is viewing on client 102. Alternatively, the set of advertisements may be served based on the process described above in relation to FIGS. 3 and 4. Thus, the set of advertisements may be received by client 102 following a request by client 102 for the set of advertisements. The request may include one or more categories, one of which may be a user preferred category identified from the user profile. The identification of the user preferred category is described above, in relation to FIG. 3.

In some embodiments, each advertisement within the set of advertisements may be associated with a display ranking that determines if an advertisement will be displayed and how prominently it will be displayed. If none of the advertisements in the received set are associated with any identified user preferred category (504—no), client 102 displays the advertisements to the user based on their original display rankings (510). If there are one or more advertisements that are associated with an identified user preferred category (504—yes), then the display rankings of those advertisements are modified (e.g., increased) (506). In other words, those advertisements that are associated with an identified user preferred category may be given rankings that make the advertisements more likely to be displayed, and/or more likely to be displayed prominently (e.g., at a higher or better display position). The advertisements are displayed based on the updated display rank values (508).

In some embodiments, the display ranking value of the received ads is modified by all or a part of the user's profile. An ad's display ranking is modified by weighting it in accordance with the category's preference score in the user's profile. For example, ads associated with a category that has a high preference score in the user's profile will have their scores upwardly modified more than ads whose associated category has a lower preference score in the user's profile or whose associated category is not present in the user's profile.

Figure 6:
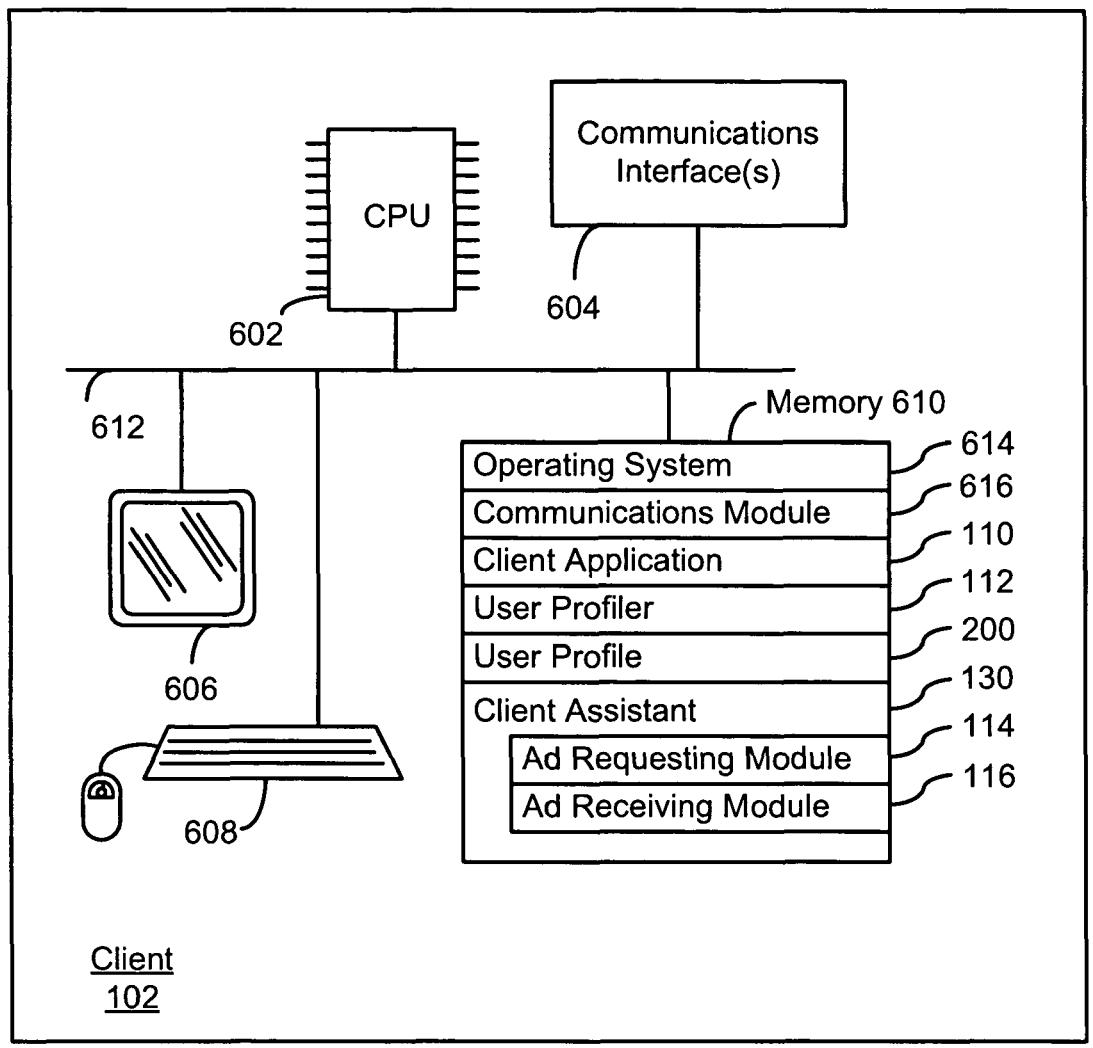
FIG. 6 is a block diagram of an exemplary client, according to some embodiments of the invention.

FIG. 6 illustrates an exemplary client 102, according to some embodiments of the invention. Client 102 includes at least one data processor or central processing unit (CPU) 602; a memory 610; communications interface(s) 604 for coupling the client 102 to and communicating with other clients, content servers, and ad servers in the network environment 100 of FIG. 1, via the communication network(s) 108; and at least one bus 612 that interconnects these components. Each client 102 may also include one or more user interface devices, such as a monitor 606 and a keyboard/mouse 608. In some embodiments, one or more of the clients 102 in the system includes a subset and/or superset of the aforementioned components.

The memory 610 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. In some embodiments, the memory 610 may include mass storage that is remotely located from the central processing unit(s) 602. The memory 610 stores an operating system 614 that includes procedures for handling basic system services and for performing hardware dependent tasks. Memory 610 also stores a communications module or instructions 616 used for communicating with other clients, content servers, and ad servers on the network environment of FIG. 1.

The memory 610 also stores the following data structures, programs and instructions, or a subset or superset thereof:
  client application 110, for rendering content and advertisements;
  user profiler 112, for profiling a user of client 102;
  user profile 200, for holding the user profile data of a user of client 102 as discussed in reference to FIG. 2; and
  a client assistant 130 including an ad requestor module (or instructions) 114, for requesting advertisements from ad servers, and ad receiver module (or instructions) 116, for receiving and processing advertisement data.

Each of the above identified elements may be stored in one or more of the previously mentioned storage devices, and corresponds to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memory 610 may store a subset of the modules and data structures identified above. Furthermore, memory 610 may store additional modules and data structures not described above.

Figure 7:
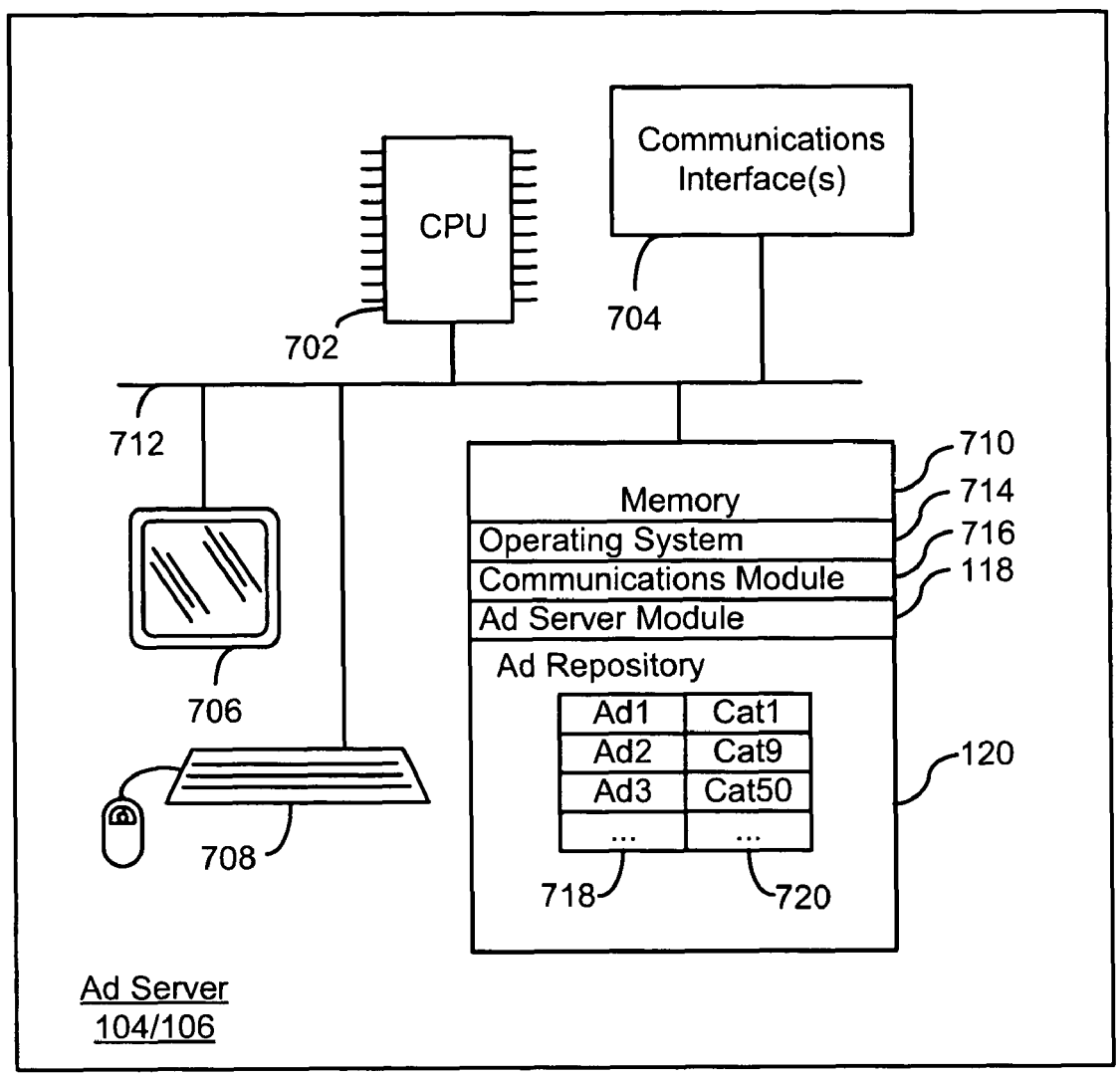
FIG. 7 is a block diagram of an exemplary ad server, according to some embodiments of the invention.

FIG. 7 illustrates an exemplary ad server 104/106, according to some embodiments of the invention. Ad server 104/106 includes at least one data processor or central processing unit (CPU) 702; a memory 710; network interface(s) 704 for coupling the ad server with and communicating with clients and other ad servers in the network environment of FIG. 1, via the communication network(s) 108; and at least one bus 712 that interconnects these components. Each ad server may also include one or more user interface devices, such as a monitor display 706 and a keyboard/mouse 708. In some embodiments, one or more of the slaves in the system includes a subset and/or superset of the aforementioned components.

The memory 710 includes high-speed random access memory and may include non-volatile memory, such as one or more magnetic disk storage devices. In some embodiments, the memory 710 may include mass storage that is remotely located from the central processing unit(s) 702. The memory 710 stores an operating system 714 that includes procedures for handling basic system services and for performing hardware dependent tasks. Memory 710 also stores a communications module or instructions 716 used for communicating with clients, other ad servers, and content servers on the network environment of FIG. 1.

The memory 710 also stores the following data structures, programs and instructions, or a subset or superset thereof:
  ad server module 118, for serving advertisements; and
  ad repository 120, for storing advertisements, with each advertisement 718 associated with a category 720.

Each of the above identified modules or procedures corresponds to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memory 710 may store a subset of the modules and data structures identified above. Furthermore, memory 710 may store additional modules and data structures not described above.

Although FIG. 7 shows ad server 104/106 as a number of discrete items, FIG. 7 is intended more as a functional description of the various features which may be present in ad server 104/106 rather than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers in ad server 104/106 and how features are allocated among them will vary from one implementation to another, and may depend in part on the amount of data traffic that the system must handle during peak usage periods as well as during average usage periods.

Although some of various drawings discussed above illustrate a number of logical stages in a particular order, stages which are not order-dependent may be reordered and other stages may be combined or broken out. While some reordering or other groupings are specifically mentioned, others will be obvious to one ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of selecting advertisements, comprising:
    at a client system having one or more processors and memory storing one or more programs for execution by the one or more processors:
    identifying first category information associated with a user profile of a user;
    preserving privacy of the user with respect to the first category information while obtaining a personalized selection of advertisements associated with the first category information, by:
        identifying second category information distinct from the first category information;
        requesting a first set of advertisements based on the first category information and the second category information from one or more first servers remote from the client system;
        receiving the first set of advertisements;
        requesting a second set of advertisements based on the second category information from one or more second servers remote from the client system;
        receiving the second set of advertisements;
        removing advertisements present in both the first set and the second set from the first set of advertisements so as to generate a difference set of one or more advertisements associated only with the first category information; and
        presenting at least one advertisement from the difference set.

2. The method of claim 1, wherein the first category information includes a category associated with a highest preference score for the user.

3. The method of claim 1, wherein each of the first and second category information comprises one or more categories; and
    as between the first and second category information, the categories are mutually exclusive.

4. The method of claim 1, wherein said identifying the first category information comprises accessing user profile information, the user profile information based on one or more of the group consisting of: electronic messages; web pages; and electronic documents.

5. The method of claim 1, wherein the first set comprises a first value representing a mathematical combination of the respective advertisements in the first set;
    the second set comprises a second value representing a mathematical combination of the respective advertisements in the second set; and
    said removing comprises performing a bit-wise exclusive-or operation between the first and second values.

6. The method of claim 1, wherein said one or more first servers and said one or more second servers are distinct from one another and do not communicate with each other regarding the difference between the first request and the second request.

7. The method of claim 1, further comprising:
    validating the said one or more first servers and said one or more second servers as authorized distributors of advertisements.

8. A computer-implemented method of serving advertisements, comprising:
    at a server system having one or more processors and memory storing one or more programs for execution by the one or more processors:
        receiving a first request for advertisements from a remote requestor, the first request including a plurality of categories that include a first category associated with the user profile of the remote requestor and a second category distinct from the first category;
        receiving a second request for advertisements from a remote requestor, the request including a plurality of categories that include the second category; and
    preserving privacy of the remote requestor with respect to the first category information while obtaining a personalized selection of advertisements associated with the first category information, by:
        identifying first advertisements corresponding to the plurality of categories in the first request;
        mathematically combining the first identified advertisements; and
        sending the combined first advertisements to the remote requestor; and
        identifying second advertisements corresponding to the plurality of categories in the second request;
        mathematically combining the second identified advertisements; and
        sending the combined second advertisements to the remote requestor;
    wherein
    each of the identified advertisements are represented by a respective sequence of bits; and
    said mathematically combining comprises performing a bit-wise exclusive-or operation on the respective sequences of bits.

9. A computer-implemented method of selecting advertisements, comprising:
    at a client system having one or more processors and memory storing one or more programs for execution by the one or more processors:
    preserving privacy of a user with respect to information contained in a user profile associated with the user while obtaining a personalized selection of advertisements associated with the user profile, by:
        requesting a first set of advertisements using a request including category information, the category information including a plurality of categories, wherein one of the plurality of categories is a preferred category from the user profile, and another of the plurality of categories is not the preferred category;
        receiving the first set of advertisements;
        requesting a second set of advertisements using a request including category information, the category information including a plurality of categories, wherein the plurality of categories are not the preferred category;

receiving the second set of advertisements;
removing advertisements present in both the first set and the second set from the first set of advertisements so as to generate a difference set of one or more advertisements associated only with the preferred category; and
modifying a display rank value for the one or more advertisements in the difference set.

10. A client system for selecting advertisements, comprising:
one or more processors;
memory storing one or more programs for execution by the one or more processors;
the one or more programs including instructions for:
identifying first category information associated with a user profile of a user;
preserving privacy of the user with respect to the first category information while obtaining a personalized selection of advertisements associated with the first category information, by:
identifying second category information distinct from the first category information;
requesting a first set of advertisements based on the first category information and the second category information from one or more first servers remote from the client system;
receiving the first set of advertisements;
requesting a second set of advertisements based on the second category information from one or more second servers remote from the client system;
receiving the second set of advertisements;
removing advertisements present in both the first set and the second set from the first set of advertisements so as to generate a difference set of one or more advertisements associated only with the first category information; and
presenting at least one advertisement from the difference set.

11. The system of claim 10, wherein the first category information includes a category associated with a highest preference score for a user.

12. The system of claim 10, wherein each of the first and second category information comprises one or more categories; and
as between the first and second category information, the categories are mutually exclusive.

13. The system of claim 10, further comprising:
user profiling instructions to modify the user profile based on one or more of the group consisting of: electronic messages, web pages, and electronic documents; and
wherein the instructions for identifying first category information include instructions to access the user profile.

14. The system of claim 10, wherein the first set comprises a first value representing a mathematical combination of the respective advertisements in the first set;
the second set comprises a second value representing a mathematical combination of the respective advertisements in the second set; and
said instructions include instructions for performing a bit-wise exclusive-or operation between the first and second values.

15. The system of claim 10, wherein said one or more first servers and said one or more second servers are distinct from one another and do not communicate with each other regarding the difference between the first request and the second request.

16. The system of claim 10, further comprising:
instructions to validate the said one or more first servers and said one or more second servers as authorized distributors of advertisements.

17. A server system for serving advertisements, comprising:
one or more processors;
memory storing one or more programs for execution by the one or more processors;
the one or more programs including instructions for:
receiving a first request for advertisements from a remote requestor, the first request including a plurality of categories that include a first category associated with the user profile of the remote requestor and a second category distinct from the first category;
receiving a second request for advertisements from a remote requestor, the request including a plurality of categories that include the second category; and
preserving privacy of the remote requestor with respect to the first category information while obtaining a personalized selection of advertisements associated with the first category information, by:
identifying first advertisements corresponding to the plurality of categories in the first request, mathematically combining the first identified advertisements, and sending the combined first advertisements to the remote requestor; and
identifying second advertisements corresponding to the plurality of categories in the second request, mathematically combining the second identified advertisements, and sending the combined second advertisements to the remote requestor;
wherein
each of the identified advertisements are represented by a sequence of bits; and
the privacy preserving instructions include instructions to perform a bit-wise exclusive-or operation on the respective sequences of bits.

18. A client system for selecting advertisements, comprising:
one or more processors;
memory storing one or more programs for execution by the one or more processors;
the one or more programs including instructions for:
preserving privacy of a user with respect to information contained in a user profile associated with the user while obtaining a personalized selection of advertisements associated with the user profile, by:
requesting a first set of advertisements using a request including category information, the category information including a plurality of categories, wherein one of the plurality is a preferred category from the user profile, and another of the plurality of categories is not the preferred category;
receiving the first set of advertisements,
requesting a second set of advertisements using a request including category information, the category information including a plurality of categories, wherein the plurality of categories are not the preferred category,
receiving the second set of advertisements;
removing advertisements present in both the first set and the second set from the first set of advertisements so as to generate a difference set of one or more advertisements associated only with the preferred category; and modifying a display rank value for the one or more advertisements in the difference set.

19. A computer readable storage medium storing one or more executable programs, the one or more programs comprising instructions for:
at a client system:
identifying first category information associated with a user profile of a user;
preserving privacy of the user with respect to the first category information while obtaining a personalized selection of advertisements associated with the first category information, by:
identifying second category information distinct from the first category information;
requesting a first set of advertisements based on the first category information and the second category information from one or more first servers remote from the client system;
receiving the first set of advertisements;
requesting a second set of advertisements based on the second category information from one or more second servers remote from the client system;
receiving the second set of advertisements;
removing advertisements present in both the first set and the second set from the first set of advertisements so as to generate a difference set of one or more advertisements associated only with the first category information; and
presenting at least one advertisement from the difference set.

20. The computer readable storage medium of claim 19, wherein said one or more first servers and said one or more second servers are distinct from one another and do not communicate with each other regarding the difference between the first request and the second request.

21. The computer readable storage medium of claim 19, further comprising instructions for:
validating the said one or more first servers and said one or more second servers as authorized distributors of advertisements.

22. The computer readable storage medium of claim 19, wherein the instructions for identifying the first category information further comprises instructions for:
accessing user profile information, the user profile information based on one or more of the group consisting of: electronic messages; web pages; and electronic documents.

23. The computer readable storage medium of claim 19, wherein the first set comprises a first value representing a mathematical combination of the respective advertisements in the first set;
wherein the second set comprises a second value representing a mathematical combination of the respective advertisements in the second set; and
wherein said instructions for removing comprises performing a bit-wise exclusive-or operation between the first and second values.

24. A computer readable storage medium storing one or more executable programs, the one or more programs comprising instructions for:
preserving privacy of a user with respect to information associated with the user profile of the user while obtaining a personalized selection of advertisements associated with the first category information, by:
requesting a first set of advertisements using a request including category information, the category information including a plurality of categories, wherein one of the plurality of categories is a preferred category from a user profile, and another of the plurality of categories is not the preferred category;
receiving the first set of advertisements;
requesting a second set of advertisements using a request including category information, the category information including a plurality of categories, wherein the plurality of categories are not the preferred category;
receiving the second set of advertisements;
removing advertisements present in both the first set and the second set from the first set of advertisements so as to generate a difference set of one or more advertisements associated only with the preferred category; and
modifying a display rank value for the one or more advertisements in the difference set.

* * * * *